United States Patent Office 3,215,684
Patented Nov. 2, 1965

3,215,684
METHOD OF PREPARING LYSINE POLYMERS
Ruth A. Strojny and Halbert C. White, Midland, Mich., assignors to The Dow Chemical Company, Midland, Mich., a corporation of Delaware
No Drawing. Filed Sept. 12, 1960, Ser. No. 55,165
4 Claims. (Cl. 260—112)

This invention concerns polymeric lysine and its method of preparation. More particularly, it concerns a method for heat polymerizing lysine alone or in admixture with one or more other neutral and/or basic α-aminocarboxylic acids and the polypeptide products thereof.

The art teaches the thermal homopolymerization of glycine to a polypeptide and the thermal homopolymerization of aspartic acid to a polyimide. The art also teaches that one can copolymerize a mixture of an acidic α-aminocarboxylic acid with another α-aminocarboxylic acid to obtain a polypeptide when glutamic acid is the sole acidic amino acid comonomer or a polyimide when aspartic acid is an amino acid comonomer. Otherwise, the art teaches that one obtains unwanted products in attempting to polymerize α-aminocarboxylic acids. See, for example, E. Katchalski, Adv. Protein Chem., 6, 126 (1951); J. Noguchi et al., J.A.C.S., 76, 2846 (1954); Bamford et al., Synthetic Polypeptides, page 7; E. G. Curphey, Chem. and Ind., 1956, 783; A. B. Meggy, J. Chem. Soc., 1956, 1450; H. Michl, Ostereichische Chem. Feit., 59, 11 (1958).

In accordance with this invention, it has been discovered that polymers of lysine alone or in admixture with one or more neutral and/or basic α-aminocarboxylic acids can be prepared by heating lysine as such or as α-aminocaprolactam, alone or in admixture with one or more neutral and/or basic α-amino acids at about 150° to about 210° C. in an inert atmosphere, e.g., in the presence of nitrogen or carbon dioxide, for a time sufficient to form a polypeptide having a preponderance of lysine α-amide linkages, i.e., at least 50 percent of α-amide linkages. Generally, a reaction time up to about 3 hours suffices. Polypeptide formation is determined in usual ways. When a mixture of one or more neutral and/or basic α-aminocarboxylic acids is to be copolymerized with lysine, it is preferred that the lysine first be melted and brought up to reaction temperature. Thereafter, other amino acids, as specified, are added to the molten lysine, advantageously with occasional mixing, and reaction is continued at the same temperature. The polypeptide product is purified in the usual way by dialysis. It is not material whether the reactant amino acids are in the L-, D-, or DL-form. Since lysine is a basic amino acid and since the amino acids to be polymerized therewith are neutral or basic, the reaction mixture is always basic.

The following examples describe completely specific embodiments and the best mode contemplated by the inventors of carrying out the invention. They are not to be considered limitative of the invention, which is defined in the claims.

*Example 1*

DL-lysine (29.2 g., 0.20 mole) was placed in an Erlenmeyer flask equipped with a thermometer and a gas inlet tube. Under a carbon dioxide atmosphere and with occasional stirring, the lysine was heated to 160°–170° C. for 3 hours. Gradually the lysine powder became a frothing, viscous mass which, on cooling, solidified into an orange-brown glass. There was obtained after dialysis, 12 g. (47 percent of theory) of an orange-brown plastic resinous polylysine.

The infrared spectrum of the dialyzed material was consistent with that of polylysine. A paper chromatogram showed this dialyzed material to be polymeric and possessing no simple amino acids. Another paper chromatogram of the total reaction mixture after acid hydrolysis of the polylysine showed it to consist of essentially lysine with only small amounts of impurities formed in the reaction sequence.

In the treatment of polymeric lysine with dinitrofluorobenzene followed by hydrolysis, most of the lysine fragments turn up as epsilon-N-dinitrophenyllysine, indicating that lysine units in the polymer are linked preponderantly by α-amide linkages.

*Paper chromatography.* — The undialyzed polymer showed the presence of a small amount of free lysine and a very slowly moving streak. After dialysis, only the slowly moving (almost immobile) component was left. A portion of the dialyzed polymer was hydrolyzed with hydrochloric acid. Chromatography of the hydrolysate showed that the polymer consisted predominantly of lysine with only very minor amounts of impurities.

*Degree of polymerization.*—The average degree of polymerization or average chain weight of the polymeric lysines is determined by the method of W. R. Middlebrook, Biochem. Biophys. Acta., 7, 547 (1951). All of the dialyzed products of this invention are polypeptides which are retained by a dialysis bag and give a positive biuret reaction.

*Titration.*—Titration with hydrochloric acid showed the polymer was basic in nature.

*Example 2*

In the same manner as described in Example 1, 5 g. of DL-lysine was heated to 170° C. When the melt had formed, 1 g. of L-histidine was added and the reaction mixture was heated for 2.5 hours with occasional stirring. The polymer obtained after dialysis weighed 1.03 g. The presence of histidine and lysine in combined form in the polymer was demonstrated by paper chromatography of the reaction mixture resulting from the hydrolysis of the polymer.

*Example 3*

A quantity of 40 g. of DL-lysine was heated to 160–170° for a few minutes to form a melt. Then 10 g. of L-histidine was added and the mixture was heated with stirring for 2 hrs. at 170–180°. The resulting product was dialyzed for 60 hrs. and 19 g. of polypeptide product was obtained. The product polypeptide was found to have insecticidal activity against the two-spotted spider mite.

*Example 4*

A quantity of 1.0 g. of an equal part by weight mixture of L-histidine, L-leucine, L-aspartic acid, DL-threonine, and DL-tryptophan was added to a melt prepared from 5 g. L-lysine and the mixture was heated for two hrs. at 170–180° followed by dialysis to give 2.2 g. of polypeptide product. Paper chromatography of the product showed no free amino acids. After hydrolysis with aqueous HCl, paper chromatography of the hydrolysate gave spots corresponding to all of the starting amino acids.

*Example 5*

A quantity of 50 g. of L-lysine was distilled giving 5.5 g. of α-aminocaprolactam boiling at 140–150° at 0.5 to 1.0 mm. pressure. The infrared pattern was consistent with the above structure.

Analysis:

| | C | H | N |
|---|---|---|---|
| Found | 56.5 | 9.35 | 20.94 |
| Calculated | 56.2 | 9.44 | 21.86 |

The α-aminocaprolactam was then heated for 2 hrs. at 175–180° and the product was dialyzed to give 1.0 g. of polylysine. The polylysine so obtained gave a positive biuret reaction.

In representative operations, polylysine having an average degree of polymerization of 10 was added to bacteriological culture media to give a concentration of 0.25 weight percent and the media were inoculated with *Staphylococcus aureus* and with *Erwinia carotovoria* and incubated at 30° C. for 3 days. At the end of this period, inhibition of growth of the organisms was observed. Controls without the polylysine showed heavy growth.

In another operation, the growth of *Pullularia pullulans* was inhibited on yeast-agar plates containing 0.25 weight percent of the same polylysine. Control plates showed abundant growth.

What is claimed is:

1. Method for making a polypeptide containing combined lysine which consists in heating at 150° to 210° C. in an inert atmosphere a mixture of lysine with at least one other α-aminocarboxylic acid of the group consisting of neutral and basic amino acids for a time sufficient to form a polypeptide the lysine units of which have a preponderance of α-amide linkages.

2. The method of claim 1 wherein the lysine is melted prior to admixture with reactant amino acid.

3. The method of claim 1 wherein the lysine is in the form of α-aminocaprolactam.

4. Method for making a homopolymeric lysine polypeptide which consists in heating lysine at 150° to 210° C. in an inert atmosphere for a time sufficient to form a polypeptide having a preponderance of α-amide linkages.

References Cited by the Examiner

UNITED STATES PATENTS

| | | | |
|---|---|---|---|
| 2,705,705 | 4/55 | Chirtel et al. | 260—78 |
| 2,786,049 | 3/57 | Lundgren et al. | 260—78 |
| 3,052,655 | 9/62 | Fox | 260—78 |
| 3,076,790 | 2/63 | Fox et al. | 260—78 |

OTHER REFERENCES

C.A., vol. 32 (1938), page 4946.

Katchalski et al., Jour. Amer. Chem. Soc., vol. 70, pp. 2094–2101, June 1948.

Sela et al., Jour. Amer. Chem. Soc., vol. 78, pp. 3986–3989, April 1956.

WILLIAM H. SHORT, *Primary Examiner.*

MILTON STERMAN, LOUISE P. QUAST, *Examiners.*